(12) United States Patent
Eaton et al.

(10) Patent No.: US 6,365,288 B1
(45) Date of Patent: Apr. 2, 2002

(54) METHOD FOR APPLYING A BARRIER LAYER TO A SILICON BASED SUBSTRATE

(75) Inventors: Harry E. Eaton, Woodstock; Thomas H. Lawton, Wethersfield, both of CT (US)

(73) Assignee: United Technologies Corporation, Hartford, CT (US)

(*) Notice: Subject to any disclaimer, the term of this patent is extended or adjusted under 35 U.S.C. 154(b) by 0 days.

(21) Appl. No.: 09/697,844

(22) Filed: Oct. 27, 2000

Related U.S. Application Data

(62) Division of application No. 09/292,351, filed on Apr. 15, 1999, now Pat. No. 6,254,935.

(51) Int. Cl.⁷ .............................. B32B 9/00; C01B 33/26

(52) U.S. Cl. .................. 428/697; 428/702; 428/428; 428/446; 428/689; 423/328.2; 423/331

(58) Field of Search .................. 428/428, 446, 428/688, 689, 697, 702; 423/328.1, 328.2, 331

(56) References Cited

U.S. PATENT DOCUMENTS 4,004,052 A * 1/1977 Bystrova et al.

* cited by examiner

Primary Examiner—Deborah Jones
Assistant Examiner—Wendy Boss
(74) Attorney, Agent, or Firm—Bachman & LaPointe, P.C.

(57) ABSTRACT

A method for applying a barrier layer which comprises a barium-strontium aluminosilicate to a silicon containing substrate which inhibits the formation of cracks.

1 Claim, 1 Drawing Sheet

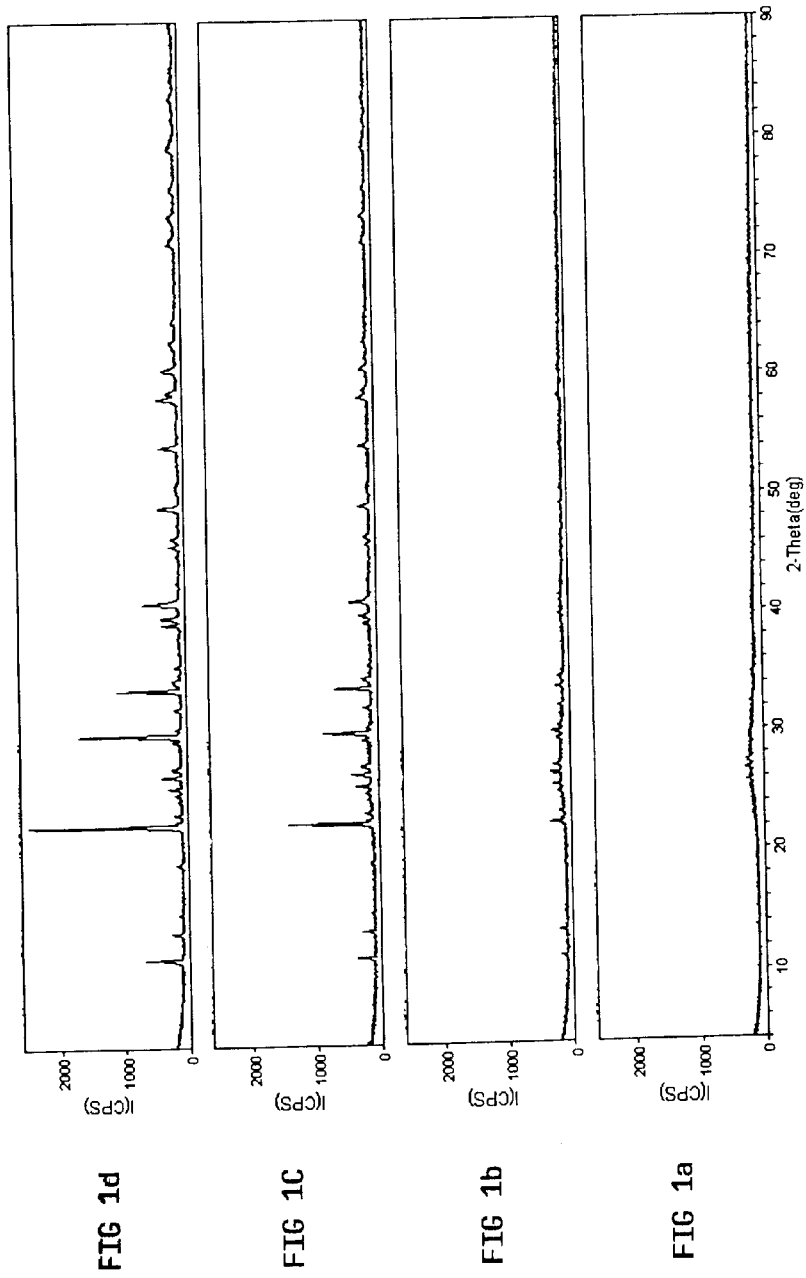
Figure 1 X-ray patterns of thermal sprayed BSAS showing the development of crystallinity in the BSAS structure versus *in situ* hold at the thermal spray temperature of 1100°C after deposition but prior to first cooling to room temperature.

METHOD FOR APPLYING A BARRIER LAYER TO A SILICON BASED SUBSTRATE

This is a Division, of application Ser. No. 09/292,351, now U.S. Pat. No. 6,254,935, filed Apr. 15, 1999. +gi This invention was made with government support under Contract No. DEAC0292CE40960 awarded by DOE. The government may have certain rights in the invention.

BACKGROUND OF THE INVENTION

The present invention relates to a method for the preparation of an article comprising a substrate containing silicon and a barium-strontium aluminosilicate barrier layer which functions as a protective environmental/thermal barrier coating.

Ceramic materials containing silicon and metal alloys containing silicon have been proposed for structures used in high temperature applications as, for example, gas turbine engines, heat exchangers, internal combustion engines, and the like. A particular useful application for these materials is for use in gas turbine engines which operate at high temperatures in aqueous environments. By aqueous environment is meant a water and/or steam environment. It has been found that these silicon containing substrates can recede and lose mass when exposed to high temperature, aqueous environments. For example, silicon carbide when exposed to a lean fuel environment of approximately 1 ATM pressure of water vapor at 1200° C. will exhibit weight loss and recession at a rate of approximately 6 mils per 1000 hrs. It is believed that the process involves oxidation of the silicon carbide to form silica on the surface of the silicon carbide followed by reaction of the silica with steam to form volatile species of silicon such as $Si(OH)_x$. It has been found that barium-strontium aluminosilicate barrier layer as a top layer is effective to reduce formation of volatile silicon species and thus reduce recession and mass loss. However, the barrier layer has been found to exhibit cracks in the fabricated matrix. Naturally it would be highly desirable to provide an external barrier coating for silicon containing substrates which is substantially crack free (cracks through the barrier layer to the substrate) and which would inhibit the formation of volatile silicon species, $Si(OH)_x$ and SiO, and thereby reduce recession and mass loss.

Accordingly, it is the principle object of the present invention to provide method for the preparation of an article comprising a silicon containing substrate with a barium-strontium aluminosilicate (BSAS) barrier layer which is substantially crack free and which inhibits the formation of gaseous species of Si, particularly $Si(OH)_x$, when the article is exposed to a high temperature, aqueous environment.

It is a further object of the present invention to provide a method for producing an article as aforesaid.

SUMMARY OF THE INVENTION

The invention relates to a method for producing an article comprising a silicon containing substrate and a barium-strontium aluminosilicate barrier layer which is substantially crack free and which inhibits the formation of gaseous species of silicon and/or provides thermal protection when the article is exposed to a high temperature, aqueous environment as defined above. In accordance with the present invention, the method comprises heating the silicon containing substrate to a temperature (T) of about greater than or equal to 1100° C., applying the barium-strontium aluminosilicate barrier layer to the substrate while the substrate is held at a temperature (T) of at least about 1100° C. and thereafter holding the coated substrate at the temperature (T) for a minimum of at least about 15 minutes prior to cooling down the coated substrate to room temperature. The resulting article exhibits a substantially crack-free barrier layer having a crystalline structure of at least 80% by volume composed of celsian and hexacelsian phases. The nature of the crystalline phases depends on the time at temperature at which it is held. The barrier layer has a coefficient of thermal expansion which is compatible with that of the Si containing substrate prior to subsequent heat treatment.

In a preferred embodiment of the present invention the article can include one or more intermediate layers between the silicon based substrate and the barium-strontium aluminosilicate barrier layer. The intermediate layer(s) serve(s) to enhance adherence between the barrier layer and the substrate and/or to prevent reactions between the barrier layer and the substrate.

Further objects and advantages of the present invention will appear hereinbelow from the following detailed description.

BRIEF DESCRIPTION OF THE DRAWINGS

FIGS. 1a, 1b, 1c and 1d show x-ray diffraction patterns of samples demonstrating the criticality of the holding time of the samples at elevated temperature after application of the barrier layer for obtaining a crystalline structure.

DETAILED DESCRIPTION

The present invention relates to a method for preparation of an article comprising a silicon containing substrate and a barium-strontium aluminosilicate barrier layer, wherein the barrier layer is substantially crack-free and inhibits the formation of gaseous species of silicon when the article is exposed to a high temperature, aqueous environment. The barrier layer may comprise a barium-strontium aluminosilicate barrier layer with or without intermediate layer as described below. In addition, it should be appreciated that while the barrier is particularly directed to an environmental barrier layer, the barrier layer also functions as a thermal barrier layer and thus the present invention broadly encompasses the use of environmental/thermal barrier layers on silicon containing substrates and on substrates having comparable thermal expansion coefficients.

According to the present invention, the silicon containing substrate may be a silicon containing ceramic substrate or a silicon containing metal alloy. In a preferred embodiment, the silicon containing substrate is a silicon containing ceramic material as, for example, silicon carbide, silicon nitride, silicon carbon nitride, silicon oxynitride and silicon aluminum oxynitride. In accordance with a particular embodiment of the present invention, the silicon containing ceramic substrate comprises a silicon containing matrix with reinforcing elements such as fibers, particles, and the like and, more particularly, a silicon based matrix which is fiber-reinforced. Particularly suitable ceramic substrates are a silicon carbide coated silicon carbide fiber-reinforced silicon carbide particle and silicon matrix, a carbon fiber-reinforced silicon carbide matrix and a silicon carbide fiber-reinforced silicon nitride matrix. Particularly useful silicon-metal alloys for use as substrates for the article of the present invention include molybdenum-silicon alloys, niobium-silicon alloys, and other Si containing alloys having a coefficient of thermal expansion compatible with the barrier layer of the present invention.

In accordance with the present invention, a barium-strontium aluminosilicate barrier layer is preferred with or without intermediate layers. A preferred barrier layer comprises from about 0.10 mole to about 0.9 mole, preferably 0.25 to about 0.75 mole BaO, 0.1 mole to about 0.9 mole, preferably 0.25 to about 0.75 SrO, 1.00 mole $Al_2O_3$ and about 2.00 mole $SiO_2$ wherein the BaO and SrO total is about 1.00 mole. A particularly suitable barrier layer for use on silicon containing ceramic compositions comprises about 0.75 mole BaO, about 0.25 mole SrO, about 1.00 mole $Al_2O_3$, and about 2.00 mole $SiO_2$.

It is an important feature of the present invention to maintain compatibility between the coefficient of thermal expansion of the silicon containing substrate and the barrier layer. In accordance with the present invention it has been found that the coefficient of thermal expansion of the barrier layer should be within ±3.0 ppm per degrees centigrade, preferably ±0.5 ppm per degrees centigrade, of the coefficient of thermal expansion of the silicon containing substrate. When using a silicon containing ceramic substrate such as a silicon carbide or a silicon nitride matrix with or without reinforcing fibers as described above in combination with the preferred barium-strontium aluminosilicate barrier layer of the present invention, it is desirable to develop a stable crystallographic structure in the barrier layer of the final article of at least 50% by volume celsian in order to obtain both structural integrity of the barrier layer and the desired thermal compatibility with respect to expansion coefficient between the silicon containing substrate and the barrier layer. The crystallographic structure of the barium-strontium aluminosilicate barrier layer is obtained as a result of the method of the present invention as will be described hereinbelow.

The barrier layer should be present in the article at a thickness of greater than or equal to about 0.5 mils (0.0005 inch), preferably between about 3 to about 30 mils and ideally between about 3 to about 5 mils. The barrier layer may be applied to the silicon based substrate by any suitable manner known in the art, however, it is preferable that the barrier layer be applied by thermal spraying as will be described hereinbelow.

The article may include, in a preferred embodiment, one or more intermediate layers between the silicon containing substrate and the BSAS barrier layer. The intermediate layer(s) serve(s) to provide enhanced adhesion between the barrier layer and the substrate and/or to prevent reactions between the barrier layer and the substrate. The intermediate layer consists of, for example, $SiO_2$, mullite, mullite-barium strontium aluminosilicate, mullite-yttrium silicate, mullite-calcium aluminosilicate, and silicon metal. It is preferred that the barrier layer comprises mullite-barium strontium aluminosilicate, mullite-yttrium silicate, or mullite-calcium aluminosilicate in an amount of between about 40 to 80 wt. % mullite and between about 20 to 60 wt. % barium strontium aluminosilicate or yttrium silicate or calcium aluminosilicate. The thickness of the intermediate layer is typical to those described above with regard to the barrier layer and the intermediate layer may likewise be disposed in any manner known in the prior art, however, preferably by thermal spraying as described hereinbelow.

In addition to the intermediate layer, a bond layer may be provided between the silicon containing substrate and the intermediate layer. A suitable bond layer includes silicon metal in a thickness of 3 to 6 mils. Alternatively, the silicon containing substrate may be pre-oxidized to provide a $SiO_2$ bond layer prior to application of the intermediate layer.

The method of the present invention comprises providing a silicon containing substrate and applying a barium-strontium aluminosilicate barrier layer (with or without intermediate layers) to the substrate wherein the barrier layer is substantially free of cracks to the silicon substrate and inhibits the formation of gaseous species of silicon when exposed to high temperature, aqueous environments. In accordance with the method of the present invention the substrate is heated to a temperature T of greater than or equal to about 1100° C., preferably greater than or equal to about 1200° C. The barrier layer comprising barium-strontium aluminosilicate is applied to the silicon containing substrate while at the temperature T to provide a coated substrate. In accordance with the preferred embodiment of the present invention the barrier layer is applied by thermal spraying. After application of the barrier layer to the silicon containing substrate at the temperature T, the coated substrate is maintained at the temperature T for a time period of greater than or equal to about 15 minutes, preferably greater than or equal to about 30 minutes, and ideally between 30 minutes and 1 hour. The coated substrate is then cooled to room temperature. It has been found that the cooled substrate, prior to final heat treatment, has a crystalline structure of at least about 80% by volume comprised of celsian and hexacelsian phases. This crystalline structure is formed during the holding period of the coated substrate at the temperature T. Without the holding period, the resulting barrier layer is greater than 90% by volume amorphous. See FIG. 2d. It is the formation of the crystalline structure which is believed to result in a substantially crack free structure in the BSAS barrier layer of the composite material. The cooled coated structure is thereafter heat treated at a temperature of greater than or equal to about 1250° C. for about 24 hours. The resulting composite has a barium-strontium aluminosilicate barrier layer having a celsian crystallographic structure in an amount of at least 50% by volume, preferably greater than at least about 80% by volume. The formation of the celsian crystallographic structure insures compatibility between the coefficient of thermal expansion of the silicon containing ceramic and the barium strontium aluminosilicate barrier layer as described above.

As noted above, one or more intermediate layers may be applied to the substrate. In accordance with the method of the present invention, a bond layer of Si may be applied to the substrate subsequent to heating the substrate and holding same at a temperature of at least about 800° C. When applying an intermediate layer comprising mullite or a combination mullite-BSAS, with or without a bond layer, the substrate is heated to a temperature of at least about 1100° C., the intermediate layer is applied at the temperature and the coated substrate is held at temperature for at least about 15 minutes prior to cooling to room temperature, preferably 30 minutes or longer, ideally 60 minutes or longer. The BSAS barrier layer is thereafter applied in accordance with the present invention.

The silicon containing substrate should be cleaned prior to application of the barrier layer to remove substrate fabrication contamination. It is preferred that the silicon based substrate be subjected to a grit blasting step prior to application of the barrier layer. The grit blasting step must be carried out carefully in order to avoid damage to the surface of the silicon-containing substrate such as silicon carbide fiber reinforced composite. It has been found that the particles used for the grit blasting should be hard enough to remove the undesired contamination but not as hard as the substrate material to prevent erosive removal of the substrate. Further, the particles must be small to prevent impact damage to the substrate. When processing an article comprising a silicon carbide ceramic composite substrate, it has been found that the grit blasting should be carried out with $Al_2O_3$ particles, preferably of a particle size of $\leq 30$ microns and, preferably, at a velocity of about 150 to 200 m/sec. In addition to the foregoing, it may be particularly useful to preoxidize the silicon based substrate prior to application of the intermediate and/or barrier layer in order to improve adherence. It has been found that bond layers of between 3 to 6 mils are preferred. $SiO_2$ bond layers of the desired thickness can be achieved by preoxidizing the silicon-carbide substrate at a temperature of between 800° C. to 1200° C. for about 15 minutes to 100 hours.

The silicon bond layer may be applied directly to the grit blasted surface by thermal spraying at approximately 870° C. a thickness of 3 to 6 mils.

Intermediate layers may be applied between the substrate and/or bond layer and the barrier layer or between the bond layer and barrier layer by thermal spraying in the same manner described above with respect to the barrier layer. As noted above, the preferred intermediate layers include mullite, mullite-barium strontium aluminosilicate, mullite-yttrium silicate, and mullite-calcium aluminosilicate.

After application of the desired layers to the silicon-based substrate material, the article is subjected to a heat treatment step in order to provide stress relief to the thermal sprayed structure, to promote bonding between the sprayed powder particles and between the layers and the substrate, and to develop the celsian phase in the BSAS barrier layer which is essentially amorphous in the as sprayed condition. The heat treatment step is carried out at a temperature of about 1250° C. for about 24 hours.

The advantages of the article of the present invention will become clear from consideration of the following examples.

EXAMPLE 1

Four samples of silicon carbide were heated to a temperature of 1100° F. and a barium-strontium aluminosilicate layer was applied to the silicon carbide substrate at the temperature of 1100° F. so as to deposit a BSAS barrier layer of 4±1 mil in thickness on the substrate. The first sample was immediately cooled to room temperature. The second, third and fourth samples were held at 1100° F., after coating, for a time of 15 minutes, 30 minutes and 60 minutes respectively. FIGS. 1a, 1b, 1c and 1d show the x-ray diffraction pattern of each of the four samples after cooling to room temperature. It can be seen from the Figures that the as-sprayed sample, not held for any time at the application temperature, is basically amorphous. The longer the sprayed sample was held at the elevated temperature, the greater crystallinity developed in the BSAS layer. In addition, the specimens of FIGS. 1a and 1c (specimens 1 and 3) were analyzed to determine the effect of the holding time on the quality of the barrier layer. The specimen of FIG. 1 which was allowed to cool to room temperature immediately after cooling exhibited 9 cracks per linear inch in the barrier layer. Specimen 3, which was held at 1100° C. after coating for a time period of 30 minutes was substantially crack free and exhibited 0 cracks per linear inch. Clearly, holding the specimen at the elevated temperature of 1100° C. after application of the barrier coating not only develops greater crystallinity in the BSAS layer but also substantially eliminates the formation of cracks in said layer.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. an article comprising:

a substrate comprising silicon; and a crystalline barium-strontium aluminosilicate barrier layer wherein said barrier layer has a crystalline structure of at least 80% by volume comprising celsian and hexacelsian phases.

* * * * *